(12) United States Patent
Endo et al.

(10) Patent No.: US 10,370,286 B2
(45) Date of Patent: Aug. 6, 2019

(54) GLASS FOR CHEMICAL TEMPERING, CHEMICALLY TEMPERED GLASS, AND GLASS PLATE FOR DISPLAY DEVICE

(71) Applicant: AGC Inc., Chiyoda-ku (JP)

(72) Inventors: Jun Endo, Chiyoda-ku (JP); Shusaku Akiba, Chiyoda-ku (JP); Kazutaka Ono, Chiyoda-ku (JP); Tetsuya Nakashima, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 14/597,587

(22) Filed: Jan. 15, 2015

(65) Prior Publication Data

US 2015/0126354 A1    May 7, 2015

Related U.S. Application Data

(63) Continuation of application No. 13/841,268, filed on Mar. 15, 2013, now abandoned, which is a
(Continued)

(30) Foreign Application Priority Data

Sep. 27, 2010 (JP) .................. 2010-215982
Dec. 24, 2010 (JP) .................. 2010-288255

(51) Int. Cl.
*C03C 21/00* (2006.01)
*C03C 3/085* (2006.01)
(Continued)

(52) U.S. Cl.
CPC .............. *C03C 3/085* (2013.01); *C03C 3/087* (2013.01); *C03C 21/00* (2013.01); *C03C 21/001* (2013.01);
(Continued)

(58) Field of Classification Search
CPC .......... C03C 3/085; C03C 3/087; C03C 3/091
See application file for complete search history.

(56) References Cited

U.S. PATENT DOCUMENTS 3,752,729 A * 8/1973 Mochel .................. C03C 3/078
428/218
3,772,135 A  11/1973 Hara et al.
(Continued)

FOREIGN PATENT DOCUMENTS

CN       1616364       5/2005
CN     101522584       9/2009
(Continued)

OTHER PUBLICATIONS

Machine translation of CN 102173580 A, obtained from Google Patent on Oct. 6, 2016.*
(Continued)

*Primary Examiner* — Z. Jim Yang
(74) *Attorney, Agent, or Firm* — Oblon, McClelland, Maier & Neustadt, L.L.P.

(57) ABSTRACT

To provide glass to be used for chemically tempered glass, of which the strength is less likely to be reduced even when indentations are formed thereon. Glass for chemical tempering, which comprises, as represented by mole percentage based on oxides, from 62 to 68% of $SiO_2$, from 6 to 12% of $Al_2O_3$, from 7 to 13% of MgO, from 9 to 17% of $Na_2O$, and from 0 to 7% of $K_2O$, wherein the difference obtained by subtracting the content of $Al_2O_3$ from the total content of $Na_2O$ and $K_2O$ is less than 10%, and when $ZrO_2$ is contained, its content is at most 0.8%. Chemically tempered glass obtained by chemically tempering such glass for chemical tempering. Such chemically tempered glass has a compressive stress layer formed on the glass surface, which has a thickness of at least 30 μm and a surface compressive stress of at least 550 MPa.

11 Claims, 1 Drawing Sheet

Related U.S. Application Data continuation of application No. PCT/JP2011/071901, filed on Sep. 26, 2011.

(51) Int. Cl.
*C03C 3/087* (2006.01)
*C03C 3/091* (2006.01)
*G02F 1/1333* (2006.01)

(52) U.S. Cl.
CPC ............ *C03C 21/002* (2013.01); *C03C 3/091* (2013.01); *G02F 2001/133302* (2013.01); *Y10T 428/26* (2015.01); *Y10T 428/315* (2015.01)

(56) References Cited

U.S. PATENT DOCUMENTS

| | | | |
|---|---|---|---|
| 5,895,768 A * | 4/1999 | Speit | C03C 1/004 428/846.9 |
| 6,333,285 B1 | 12/2001 | Chipinet et al. | |
| 6,518,211 B1 * | 2/2003 | Bradshaw | C03C 3/085 428/410 |
| 6,949,485 B2 | 9/2005 | Nakashima et al. | |
| 7,309,671 B2 | 12/2007 | Kurachi et al. | |
| 7,666,511 B2 | 2/2010 | Ellison et al. | |
| 8,168,313 B2 | 5/2012 | Endo et al. | |
| 8,312,739 B2 * | 11/2012 | Lee | C03C 3/093 65/30.13 |
| 8,349,455 B2 | 1/2013 | Kondo et al. | |
| 8,518,545 B2 | 8/2013 | Akiba et al. | |
| 8,604,693 B2 | 12/2013 | Ono et al. | |
| 8,840,997 B2 * | 9/2014 | Koyama | C03C 3/085 428/410 |
| 9,434,644 B2 * | 9/2016 | Koyama | C03C 3/085 |
| 2003/0220183 A1 * | 11/2003 | Kurachi | C03C 3/087 501/70 |
| 2008/0286548 A1 | 11/2008 | Ellison et al. | |
| 2009/0197088 A1 | 8/2009 | Murata | |
| 2009/0202808 A1 * | 8/2009 | Glaesemann | C03C 3/091 428/220 |
| 2009/0220761 A1 | 9/2009 | Dejneka et al. | |
| 2009/0220824 A1 * | 9/2009 | Ikenishi | B24B 37/042 428/846.9 |
| 2009/0298669 A1 * | 12/2009 | Akiba | C03C 3/085 501/70 |
| 2010/0009154 A1 * | 1/2010 | Allan | C03C 3/085 428/220 |
| 2010/0035038 A1 * | 2/2010 | Barefoot | C03C 3/064 428/220 |
| 2010/0047521 A1 * | 2/2010 | Amin | C03C 3/083 428/141 |
| 2010/0255350 A1 * | 10/2010 | Endo | C03C 3/085 428/846.9 |
| 2011/0003483 A1 * | 1/2011 | Nishizawa | C03B 25/08 438/778 |
| 2011/0014475 A1 * | 1/2011 | Murata | C03B 17/064 428/410 |
| 2011/0071012 A1 * | 3/2011 | Kondo | C03C 3/085 501/71 |
| 2012/0015197 A1 * | 1/2012 | Sun | C03C 3/091 428/428 |
| 2012/0052275 A1 * | 3/2012 | Hashimoto | C03C 3/087 428/215 |
| 2012/0083401 A1 * | 4/2012 | Koyama | C03C 3/085 501/70 |
| 2012/0134025 A1 * | 5/2012 | Hart | C03C 15/00 359/601 |
| 2012/0171497 A1 * | 7/2012 | Koyama | C03C 3/085 428/428 |
| 2012/0196109 A1 * | 8/2012 | Marjanovic | C03C 3/085 428/220 |
| 2012/0199203 A1 * | 8/2012 | Nishizawa | C03C 3/085 136/262 |
| 2012/0297829 A1 | 11/2012 | Endo et al. | |
| 2013/0011650 A1 | 1/2013 | Akiba et al. | |
| 2013/0115422 A1 * | 5/2013 | Murata | C03C 3/085 428/141 |
| 2013/0202715 A1 * | 8/2013 | Wang | C03C 3/095 424/618 |
| 2013/0209751 A1 * | 8/2013 | Zhang | C03C 3/095 428/174 |
| 2013/0224491 A1 * | 8/2013 | Smedskjaer | C03C 3/085 428/410 |
| 2013/0302617 A1 | 11/2013 | Akiba et al. | |

FOREIGN PATENT DOCUMENTS

| | | | |
|---|---|---|---|
| CN | 101541696 | | 9/2009 |
| CN | 101575167 | | 11/2009 |
| CN | 101591139 | | 12/2009 |
| CN | 102092940 | | 6/2011 |
| CN | 102173580 A | * | 9/2011 |
| CN | 102249542 | | 11/2011 |
| JP | 2002-507538 | | 3/2002 |
| JP | 2004-43295 | | 2/2004 |
| JP | 2005-51116 | | 2/2005 |
| JP | 2007-11210 | | 1/2007 |
| JP | 2010-168252 | | 8/2010 |
| KR | 10-2009-0124973 | | 10/2009 |
| TW | 200922899 A | | 6/2009 |
| WO | 2010/021746 | | 2/2010 |
| WO | 2011/144024 | | 11/2011 |
| WO | 2012/043482 | | 4/2015 |

OTHER PUBLICATIONS

Brent Wedding, "Measurements of High-Temperature Absorption Coefficients of Glasses" Journal of the American Ceramic Society, 1975, vol. 58, No. 3-4, p. 102-105.

Robert Carl, et al., "The effect of composition on UV-vis-NIR spectra of iron doped glasses in the systems Na20/Mgo/SiO2 and Na20/MgO/A1203/SiO" Journal of Non-Crystalline Solids, 353 (2007) 244-249.

U.S. Appl. No. 13/943,426, filed Jul. 16, 2013, US2013/0302617 A1, Akiba et al.

International Search Report dated Dec. 27, 2011 in PCT/JP2011/071901 filed Sep. 26, 2011.

Combined Chinese Office Action dated Aug. 26, 2014 in Patent Application No. 201180044270.7 (with English translation of categories of cited documents).

Office Action as received in the corresponding Chinese Patent Application No. 201410783385.3 dated Jun. 13, 2016.

\* cited by examiner

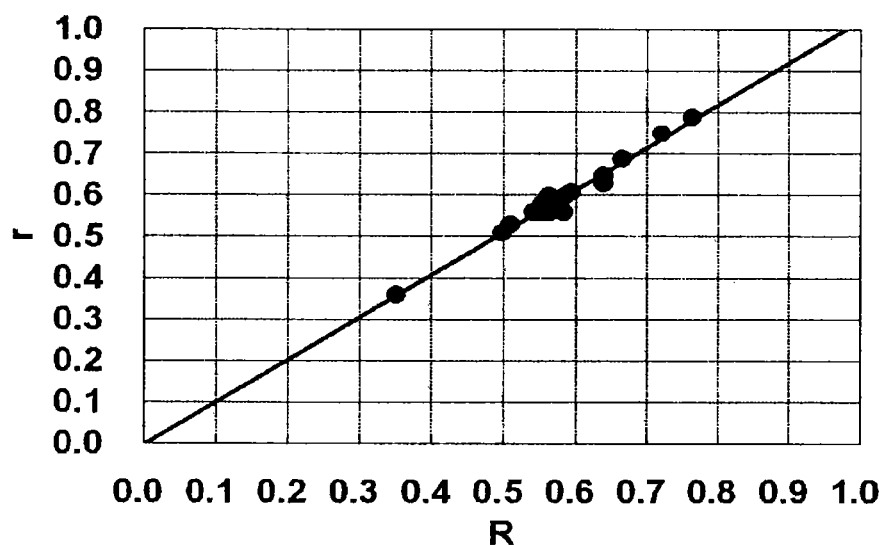

GLASS FOR CHEMICAL TEMPERING, CHEMICALLY TEMPERED GLASS, AND GLASS PLATE FOR DISPLAY DEVICE

TECHNICAL FIELD

The present invention relates to a display device for e.g. a mobile device such as a cell phone or a personal digital assistance (PDA), a large-sized flat screen television such as a large-sized liquid crystal television or a large-sized plasma television and a touch panel, a glass plate for a display device suitable for e.g. a cover glass for a display device, and chemically tempered glass or glass for chemical tempering suitable for such a glass plate for a display device.

BACKGROUND ART

In recent years, for display devices such as mobile devices, liquid crystal televisions, touch panels, etc., a cover glass (protective glass) has been used in many cases to protect a display and to improve appearance.

For such display devices, weight reduction and thickness reduction are required for differentiation by a flat design or for reduction of the load for transportation. Therefore, a cover glass to be used for protecting a display is also required to be made thin. However, if the thickness of the cover glass is made to be thin, the strength is lowered, and there has been a problem such that the cover glass itself is broken by e.g. a shock due to a falling or flying object in the case of an installed type or by dropping during the use in the case of a portable device, and the cover glass cannot perform the essential role to protect the display device.

In order to solve the above problem, it is conceivable to improve the strength of the cover glass, and as such a method, a method to form a compressive stress layer on a glass surface is commonly known.

The method to form a compressive stress layer on a glass surface, may typically be an air quenching tempering method (physical tempering method) wherein a surface of a glass plate heated to near the softening point is quenched by air cooling or the like, or a chemical tempering method wherein alkali metal ions having a small ion radius (typically Li ions or Na ions) at a glass plate surface are exchanged with alkali ions having a larger ion radius (typically K ions) by ion exchange at a temperature lower than the glass transition point.

As mentioned above, the thickness of the cover glass is required to be thin. However, if the air quenching tempering method is applied to a thin glass plate having a thickness of less than 2 mm, as required for a cover glass, the temperature difference between the surface and the inside tends not to arise, and it is thereby difficult to form a compressive stress layer, and the desired property of high strength cannot be obtained. Therefore, a cover glass tempered by the latter chemical tempering method is usually used.

As such a cover glass, one having soda lime glass chemically tempered is widely used (e.g. Patent Document 1).

Soda lime glass is inexpensive and has a feature that the surface compressive stress S of a compressive stress layer formed at the surface of the glass by the chemical tempering can be made to be at least 550 MPa, but there has been a problem that it has been difficult to make the thickness t of the compressive stress layer to be at least 30 μm.

Therefore, one having $SiO_2$—$Al_2O_3$—$Na_2O$ type glass different from soda lime glass, chemically tempered, has been proposed for such a cover glass (e.g. Patent Document 2).

Such $SiO_2$—$Al_2O_3$—$Na_2O$ type glass has a feature that it is possible not only to make the above S to be at least 550 MPa but also to make the above t to be at least 30 μm.

PRIOR ART DOCUMENTS

Patent Documents

Patent Document 1: JP-A-2007-11210
Patent Document 2: US Patent Application Publication No. 2009/0298669

DISCLOSURE OF INVENTION

Technical Problem

It is highly possible that a mobile device is dropped from the user's hand, pocket or bag and its cover glass gets flaws (indentations), or the dropped mobile device may be stepped on or the user may sit on the mobile device put in the pocket, and a heavy load may thereby be applied to the cover glass in many cases.

A flat screen television such as a liquid crystal television or a plasma television, particularly a large-sized flat screen television having a size of at least 20 inches, is likely to have flaws since its cover glass has a large size, and as the screen is large, the probability of breakage from the flaws as the breakage origin is high. Further, when a flat screen television is used as hung on the wall, it may fall down, and in such a case, a large load may be applied to the cover glass.

A touch panel is likely to have flaws such as scratches at the time of its use.

As such large or small display devices are used more widely now, the number of incidences of breakage of the cover glass itself is increased as compared with the past when the number of use was small or limited.

Whereas, with a cover glass having glass chemically tempered as disclosed in Patent Document 2, the strength is likely to be lowered, once an indentation is imparted to the cover glass during its use, and there has been a problem such that the cover glass is likely to be broken if a load such as a shock or static load is imparted thereto. In the present invention, "get flaws" and "get indentations" are used in the same meaning and include a case where cracking is not yet observed.

It is an object of the present invention to provide chemically tempered glass, of which the strength is less likely to be lowered, as compared with the conventional one, even if indentations are formed thereon, and glass to be used therefor.

Solution to Problem

The present invention provides glass for chemical tempering, which comprises, as represented by mole percentage based on oxides, from 62 to 68% of $SiO_2$, from 6 to 12% of $Al_2O_3$, from 7 to 13% of MgO, from 9 to 17% of $Na_2O$, and from 0 to 7% of $K_2O$, wherein the difference ($R_2O$—$Al_2O_3$) obtained by subtracting the content of $Al_2O_3$ from the total content of $R_2O$ i.e. $Na_2O$ and $K_2O$, is less than 10%, and when $ZrO_2$ is contained, its content is at most 0.8%. Here, for example "from 62 to 68%" means at least 62% and at most 68%.

The present invention further provides the above glass for chemical tempering, which contains from 64 to 67% of $SiO_2$, and from 6 to 7.5% of $Al_2O_3$, wherein the total content of $SiO_2$ and $Al_2O_3$ is from 69 to 73%.

The present invention further provides glass for chemical tempering, which comprises, as represented by mole percentage based on oxides, from 62 to 66% of $SiO_2$, from 6 to 12% of $Al_2O_3$, from 7 to 13% of MgO, from 9 to 17% of $Na_2O$, and from 0 to 7% of $K_2O$, wherein ($R_2O$—$Al_2O_3$) is less than 10%, and when $ZrO_2$ is contained, its content is at most 0.8% (hereinafter this glass for chemical tempering will sometimes be referred to as glass A).

The present invention further provides glass for chemical tempering, which comprises, as represented by mole percentage based on oxides, from 64 to 68% of $SiO_2$, from 6 to 11% of $Al_2O_3$, from 7 to 12% of MgO, from 12 to 17% of $Na_2O$, and from 0 to 6% of $K_2O$, wherein ($R_2O$—$Al_2O_3$) is less than 10%, and when $ZrO_2$ is contained, its content is at most 0.8% (hereinafter this glass for chemical tempering will sometimes be referred to as glass B).

The present invention further provides the above glass for chemical tempering, which contains from 65 to 68% of $SiO_2$, from 7 to 10% of $Al_2O_3$, and from 0 to 2.5% of $K_2O$, wherein the total content of $SiO_2$ and $Al_2O_3$ is from 73.5 to 76%.

The present invention further provides the above glass for chemical tempering, wherein the content of $SiO_2$ is at most 66%.

The present invention further provides the above glass for chemical tempering, which is to be used for obtaining glass, of which a compressive stress layer formed on the glass surface by chemical tempering has a thickness t of at least 30 μm and a surface compressive stress S of at least 550 MPa.

The present invention further provides the above glass for chemical tempering, wherein F1/F0 can be made to be at least 0.9, where F0 is a flexural strength of a chemically tempered glass plate which is obtained by chemically tempering a glass plate made of the glass for chemical tempering and having a thickness of 1 mm and a size of 5 mm×40 mm and which has t of at least 30 μm and S of at least 550 MPa, and F1 is a flexural strength of such a chemically tempered glass plate having a Vickers indenter impressed thereinto with a force of 9.8N. Here, typically the above t is from 45 to 55 μm and the above S is from 750 to 850 MPa.

The present invention further provides the above glass for chemical tempering, wherein F2/F0 can be made to be at least 0.7, where F0 is a flexural strength of a chemically tempered glass plate which is obtained by chemically tempering a glass plate made of the glass for chemical tempering and having a thickness of 1 mm and a size of 5 mm×40 mm and which has t of at least 30 μm and S of at least 550 MPa, and F2 is a flexural strength of such a chemically tempered glass plate having a Vickers indenter impressed thereinto with a force of 19.6N. Here, typically the above t is from 45 to 55 μm and the above S is from 750 to 850 MPa.

The present invention further provides chemically tempered glass, which is obtained by chemically tempering the above glass for chemical tempering.

The present invention further provides a chemically tempered glass plate which is a glass plate made of the above chemically tempered glass and having a thickness of from 0.4 to 1.2 mm, wherein F1/F0 is at least 0.9, where F0 is its flexural strength and F1 is a flexural strength of the glass plate having a Vickers indenter impressed thereinto with a force of 9.8N.

The present invention further provides a chemically tempered glass plate which is a glass plate made of the above chemically tempered glass and having a thickness of from 0.4 to 1.2 mm, wherein F2/F0 is at least 0.7, where F0 is its flexural strength and F2 is a flexural strength of the glass plate having a Vickers indenter impressed thereinto with a force of 19.6N.

The present invention further provides a glass plate for a display device, which is made of the above chemically tempered glass or the above chemically tempered glass plate.

The present invention further provides a display device, which has a cover glass comprising the above glass plate for a display device.

The present invention further provides the above display device, which is a mobile device, a touch panel or a flat screen television with a size of at least 20 inches.

The present inventors have found that $SiO_2$ and $Al_2O_3$ in glass prevent lowering of the strength which takes place when an indentation is imparted to the glass even if the glass is chemically tempered, while $ZrO_2$ promotes lowering of the strength and that if it is attempted to reduce $ZrO_2$ in order to prevent lowering of the strength, the glass transition point Tg tends to decrease thus leading to such a problem that stress relaxation is likely to occur. However, even in such a case, it has been found possible to prevent lowering of Tg by adjusting the above ($R_2O$—$Al_2O_3$) to be less than 10%, whereby the present invention has been accomplished.

Advantageous Effects of Invention

According to the present invention, the strength of glass is less likely to be lowered even if indentations are imparted to chemically tempered glass during its use, whereby it is possible to obtain chemically tempered glass which is less likely to be broken even if a load such as a shock or static load is imparted to the glass, and glass for chemical tempering, which is suitable for such chemically tempered glass.

Further, it is possible to obtain a display device for e.g. a mobile device, a touch panel, a flat screen television, etc., wherein such chemically tempered glass is used as a glass plate for the display device, such as a cover glass.

BRIEF DESCRIPTION OF DRAWING

FIG. 1 is a graph showing the relation between R obtained by calculation from the glass composition and the decrease ratio r of the surface compressive stress due to an increase of the Na concentration in the molten potassium salt.

DESCRIPTION OF EMBODIMENTS

The chemically tempered glass, the chemically tempered glass plate and the glass plate for a display device of the present invention are each obtained by chemically tempering the glass for chemical tempering of the present invention (hereinafter referred to as the glass of the present invention), and hereinafter they will generally be referred to as the tempered glass of the present invention.

The above S of the tempered glass of the present invention is preferably at least 550 MPa, more preferably more than 700 MPa. Further, S is typically at most 1,200 MPa.

The above t of the tempered glass of the present invention is preferably at least 30 μm, more preferably exceeds 40 μm. Further, t is typically at most 70 μm.

The method of chemical tempering treatment to obtain the tempered glass of the present invention is not particularly limited so long as $Na_2O$ in the glass surface layer can be ion exchanged with $K_2O$ in the molten salt, and it may, for example, be a method of immersing the glass in a heated potassium nitrate ($KNO_3$) molten salt. This $KNO_3$ molten salt may be one which contains e.g. $NaNO_3$ in an amount of at most about 5%, in addition to $KNO_3$.

Chemical tempering treatment conditions to form a chemically tempered layer (compressive stress layer) having a desired surface compressive stress on the glass may vary depending upon e.g. the thickness in the case of a glass plate. However, it is typical to immerse a glass substrate in a $KNO_3$ molten salt at from 350 to 550° C. for from 2 to 20 hours. From the economical viewpoint, the immersion is carried out preferably under conditions of from 350 to 500° C. and from 2 to 16 hours, and more preferably, the immersion time is from 2 to 10 hours.

A glass plate obtained by chemically tempering a glass plate made of the glass of the present invention and having a thickness of from 0.4 to 1.2 mm, is preferably one wherein F1/F0 is at least 0.9, where F0 is its flexural strength and F1 is a flexural strength of the glass plate having a Vickers indenter impressed thereinto with a force of 9.8N. If F1/F0 is not at least 0.9, the glass tends to be readily broken when an indentation is formed on the surface of the glass plate with a force of 9.8N. More preferably, F1/F0 is at least 0.95.

A glass plate obtained by chemically tempering a glass plate made of the glass of the present invention and having a thickness of from 0.4 to 1.2 mm, is preferably one wherein F2/F0 is at least 0.7, where F0 is its flexural strength and F2 is a flexural strength of the glass plate having a Vickers indenter impressed thereinto with a force of 19.6N. If F2/F0 is not at least 0.7, the glass tends to be readily broken when an indentation is formed on the surface of the glass plate with a force of 19.6N. F2/F0 is more preferably at least 0.8, particularly preferably at least 0.9.

A compressive stress layer of such a glass plate obtained by chemically tempering a glass plate made of the glass of the present invention and having a thickness of from 0.4 to 1.2 mm, preferably has a thickness t of at least 30 μm and a surface compressive stress S of at least 550 MPa. Typically, t is from 40 to 60 μm, and S is from 650 to 820 MPa.

The glass plate for a display device of the present invention is usually obtained by chemically tempering a glass plate obtained by processing a glass plate made of the glass of the present invention by e.g. cutting, hole making, polishing, etc.

The thickness of the glass plate for a display device of the present invention is typically from 0.3 to 2 mm, usually from 0.4 to 1.2 mm.

The glass plate for a display device of the present invention is typically a cover glass.

A method for producing a glass plate made of the above glass of the present invention is not particularly limited, and for example, various raw materials are mixed in proper amounts, heated and melted at from about 1,400 to 1,700° C. and then homogenized by deforming, stirring or the like and formed into a plate by a well-known float process, downdraw method or press method, which is annealed and then cut into a desired size to obtain the glass plate.

The glass transition point Tg of the glass of the present invention is preferably at least 400° C. If it is lower than 400° C., the surface compressive stress is likely to be relaxed during the ion exchange, and no adequate stress may be obtained. It is typically at least 570° C., preferably at least 600° C.

The temperature T2 at which the viscosity of the glass of the present invention becomes $10^2$ dPa·s is preferably at most 1,650° C. If T2 exceeds 1,650° C., melting of the glass tends to be difficult.

The temperature T4 at which the viscosity of the glass of the present invention becomes $10^4$ dPa·s is preferably at most 1,250° C. If T4 exceeds 1,250° C., molding of the glass tends to be difficult.

The specific gravity d of the glass of the present invention is preferably at most 2.60, more preferably at most 2.55.

In a case where it is desired to lower T2 or T4 in order to facilitate melting or molding of the glass, the glass of the present invention is preferably glass A.

In a case where it is desired to make the strength less likely to be lowered even when an indentation is formed, the glass of the present invention is preferably glass B.

Now, the composition of the glass of the present invention will be described by using contents represented by mole percentage unless otherwise specified.

$SiO_2$ is a component to constitute a glass matrix and is essential. If the $SiO_2$ content is less than 62%, lowering of the strength tends to occur when an indentation is formed, cracking tends to occur when scratch is formed, the weather resistance tends to be low, the specific gravity tends to increase, or the glass tends to be unstable when the liquid phase temperature is raised. $SiO_2$ is preferably at least 63%, and in glass B, it is at least 64%, preferably at least 65%. If $SiO_2$ exceeds 68%, T2 or T4 tends to increase, whereby melting or molding of the glass tends to be difficult. $SiO_2$ is preferably at most 66%, more preferably at most 65.5%, and in glass A, it is at most 66%. In glass A, in a case where it is desired to more certainly prevent lowering of the strength when an indentation is formed on the glass surface, $SiO_2$ is typically from 63 to 65%, and the $SiO_2$ content as represented by mole percentage is typically less than 64%.

$Al_2O_3$ is a component to improve the ion exchange performance and the weather resistance, and is essential. If it is less than 6%, lowering of the strength tends to occur when an indentation is formed, or it tends to be difficult to obtain the desired surface compressive stress S or compressive stress layer thickness t by ion exchange. $Al_2O_3$ is preferably at least 6.5%, more preferably at least 7%, particularly preferably at least 7.5%. If $Al_2O_3$ exceeds 12%, T2 or T4 tends to increase, whereby melting or molding of the glass tends to be difficult, or the liquid phase temperature tends to be high to cause devitrification. It is preferably at most 11.5%, and in glass B, it is preferably at most 10%.

The total content of $SiO_2$ and $Al_2O_3$ is preferably at least 71%. If the total content is less than 71%, lowering of the strength tends to occur when an indentation is formed, and it is typically more than 72%. In glass B, the total content is typically from 73.5 to 76%.

MgO is a component which may decrease the ion exchange rate, but it is a component to prevent cracking or to improve the melting property, and thus is essential. If MgO is less than 7%, T2 or T4 tends to increase, whereby melting or molding of the glass tends to be difficult, and it is preferably at least 7.5%, more preferably at least 8%. If MgO exceeds 13%, the liquid phase temperature tends to increase to cause devitrification, or lowering of the strength tends to occur when an indentation is formed, and it is preferably at most 12.5%, more preferably at most 12%. In glass B, it is at most 12%. In a case where it is desired to more certainly prevent lowering of the strength when an indentation is formed on the glass surface, MgO is typically from 8 to 11%.

Na$_2$O is a component to form a surface compressive stress layer by ion exchange and to improve the melting property of the glass, and is essential. If the Na$_2$O content is less than 9%, it tends to be difficult to form a desired surface compressive stress layer by ion exchange, and it is preferably at least 9.5%, more preferably at least 10%, particularly preferably at least 10.5%. In glass B, it is at least 12%. If Na$_2$O exceeds 17%, the weather resistance tends to decrease, or cracking is likely to be formed from an indentation. It is preferably at most 16%.

The total content of Na$_2$O and MgO is preferably from 21 to 25%. If the total content is less than 21%, T2 or T4 tends to increase, whereby melting or molding of the glass tends to be difficult. If the total content exceeds 25%, cracking tends to be formed from an indentation, or lowering of the strength tends to occur when an indentation is formed.

K$_2$O is not essential but is a component to increase the ion exchange rate, and thus, it may be contained up to 7%. If K$_2$O exceeds 7%, lowering of the strength tends to occur when an indentation is formed, or cracking tends to be formed from an indentation, and it is preferably at most 6.5%, more preferably at most 6%. In glass B, it is at most 6%, preferably at most 2.5%. When K$_2$O is contained, its content is preferably at least 0.5%.

When K$_2$O is contained, the total content of R$_2$O i.e.Na$_2$O and K$_2$O is preferably at most 22%. If R$_2$O exceeds 22%, the weather resistance tends to be low, or cracking tends to be formed from an indentation. It is preferably at most 21%, more preferably at mot 20%, and in glass B, it is preferably at most 18%. Further, R$_2$O is preferably at least 14%, typically at least 15%.

In the glass of the present invention, particularly glass B, the total content of Na$_2$O, K$_2$O and MgO is preferably from 24 to 28%. If the total content is less than 24%, T2 or T4 tends to increase, whereby melting or molding of the glass tends to be difficult, and if it exceeds 28%, cracking tends to be formed from an indentation, or lowering of the strength tends to occur when an indentation is formed. It is typically at most 27%.

In a case where it is desired to certainly prevent lowering of the strength when an indentation is formed on the glass surface, typically Na$_2$O is from 11 to 16% or from 12 to 16%, K$_2$O is from 0 to 5%, R$_2$O is from 15 to 17%, and in a case where the K$_2$O content is less than 3%, Na$_2$O is typically from 13.5 to 16%.

In a case where it is desired to increase Tg, the difference (R$_2$O—Al$_2$O$_3$) obtained by subtracting Al$_2$O$_3$ from R$_2$O, is preferably less than 10%. If said difference is at least 10%, Tg tends to be low, or stress relaxation tends to occur during the chemical tempering.

ZrO$_2$ is not essential, but may be contained within a range of up to 0.8% in order to lower the viscosity at a high temperature or to increase the surface compressive stress. If ZrO$_2$ exceeds 0.8%, lowering of the strength tends to occur, or chipping is likely to occur. It is preferably at most 0.7%, more preferably at most 0.6%, particularly preferably at most 0.55%, and in glass B, it is preferably at most 0.5%.

The glass of the present invention is preferably one wherein R calculated by the following formula by using the contents of the respective components of SiO$_2$, Al$_2$O$_3$, MgO, CaO, ZrO$_2$, Na$_2$O and K$_2$O is at least 0.66:

$$R=0.029\times SiO_2+0.021\times Al_2O_3+0.016\times MgO-0.004\times CaO+0.016\times ZrO_2+0.029\times Na_2O+0\times K_2O-2.002$$

In the following, the technical significance of R being at least 0.66 will be described.

Usually, the ion exchange treatment for chemical tempering is carried out by immersing glass containing sodium (Na) in a molten potassium salt, and as the potassium salt, potassium nitrate or a mixed salt of potassium nitrate and sodium nitrate is used.

In such ion exchange treatment, ion exchange of Na in the glass with potassium (K) in the molten salt is carried out. Therefore, if the ion exchange treatment is repeated by using the same molten salt, the Na concentration in the molten salt increases.

If the Na concentration in the molten salt increases, the surface compressive stress S of the chemically tempered glass decreases, and therefore, there has been a problem that it is necessary to strictly watch the Na concentration in the molten salt and to frequently carry out replacement of the molten salt, so that S of the chemically tempered glass will not become lower than the desired value.

It is desired to reduce the frequency of such replacement of the molten salt, and glass B wherein R is at least 0.66, is one of embodiments of the present invention suitable to solve such a problem.

The present inventors have considered that there may be a relation between the composition of Na-containing glass and such a phenomenon that by repeating ion exchange treatment of immersing the Na-containing glass in a molten potassium salt many times to obtain chemically tempered glass, the Na concentration in the molten potassium salt increases and at the same time, the surface compressive stress of the chemically tempered glass becomes small, and have conducted the following experiment.

Firstly, 29 types of glass plates were prepared which had compositions as represented by mole percentage in Tables 1 to 3 and each of which had a thickness of 1.5 mm and a size of 20 mm×20 mm and had both sides mirror-polished with cerium oxide. The glass transition points Tg (unit: ° C.) of these glasses are shown in the same Tables. Here, those provided with * are ones calculated from the compositions.

These 29 types of glass plates were subjected to ion exchange of immersing for 10 hours in a molten potassium salt having a KNO$_3$ content of 100% and having a temperature of 400° C. to obtain chemically tempered glass plates, whereupon their surface compressive stresses CS1 (unit: MPa) were measured. Here, glass A27 is glass used for a cover glass for a mobile device.

Further, these 29 types of glass plates were subjected to ion exchange of immersing for 10 hours in a molten potassium salt having a KNO$_3$ content of 95% and a NaNO$_3$ content of 5% and having a temperature of 400° C. to obtain chemically tempered glass plates, whereupon their surface compressive stresses CS2 (unit: MPa) were measured.

CS1 and CS2 are shown together with their ratio r=CS2/CS1 in the corresponding rows in Tables 1 to 3. r of conventional cover glass A27 is 0.65.

TABLE 1

| Glass | α1 | α2 | A1 | A2 | A3 | A4 | A5 | A6 | A7 | A8 |
|---|---|---|---|---|---|---|---|---|---|---|
| SiO$_2$ | 73.0 | 72.0 | 64.3 | 64.3 | 64.3 | 64.3 | 63.8 | 63.8 | 64.3 | 64.3 |
| Al$_2$O$_3$ | 7.0 | 6.0 | 6.5 | 7.0 | 6.5 | 7.0 | 7.0 | 7.5 | 6.0 | 6.0 |
| MgO | 6.0 | 10.0 | 11.0 | 11.0 | 11.0 | 11.0 | 11.0 | 11.0 | 11.5 | 12.0 |

TABLE 1-continued

| Glass | α1 | α2 | A1 | A2 | A3 | A4 | A5 | A6 | A7 | A8 |
|---|---|---|---|---|---|---|---|---|---|---|
| CaO | 0 | 0 | 0.1 | 0.1 | 0.1 | 0.1 | 0.1 | 0.1 | 0.1 | 0.1 |
| SrO | 0 | 0 | 0.1 | 0.1 | 0.1 | 0.1 | 0.1 | 0.1 | 0.1 | 0.1 |
| BaO | 0 | 0 | 0.1 | 0.1 | 0.1 | 0.1 | 0.1 | 0.1 | 0.1 | 0.1 |
| $ZrO_2$ | 0 | 0 | 2.0 | 1.5 | 1.5 | 1.0 | 1.5 | 1.0 | 2.0 | 1.5 |
| $Na_2O$ | 14.0 | 12.0 | 12.0 | 12.0 | 12.5 | 12.5 | 12.5 | 12.5 | 12.0 | 12.0 |
| $K_2O$ | 0 | 0 | 4.0 | 4.0 | 4.0 | 4.0 | 4.0 | 4.0 | 4.0 | 4.0 |
| Tg | 617 | 647 | 615 | 617 | 608 | 603 | 614 | 610 | 615 | 609 |
| CS1 | 888 | 900 | 1049 | 1063 | 1035 | 1047 | 1063 | 1046 | 1020 | 1017 |
| CS2 | 701 | 671 | 589 | 593 | 601 | 590 | 601 | 599 | 588 | 579 |
| r |  | 0.79 | 0.75 | 0.56 | 0.56 | 0.58 | 0.56 | 0.57 | 0.57 | 0.58 | 0.57 |
| R |  | 0.76 | 0.72 | 0.55 | 0.56 | 0.56 | 0.56 | 0.56 | 0.56 | 0.55 | 0.55 |

TABLE 2

| Glass | A9 | A10 | A11 | A12 | A13 | A14 | A15 | A16 | A17 | A18 |
|---|---|---|---|---|---|---|---|---|---|---|
| $SiO_2$ | 64.3 | 64.3 | 64.3 | 64.3 | 64.3 | 65.3 | 64.3 | 60.3 | 56.3 | 64.3 |
| $Al_2O_3$ | 7.2 | 7.0 | 6.0 | 6.0 | 8.0 | 7.0 | 10.0 | 11.5 | 15.5 | 8.0 |
| MgO | 11.0 | 11.0 | 12.5 | 13.0 | 11.0 | 11.0 | 8.5 | 11.0 | 11.0 | 10.5 |
| CaO | 0.1 | 0.1 | 0.1 | 0.1 | 0.1 | 0.1 | 0.1 | 0.1 | 0.1 | 0.1 |
| SrO | 0.1 | 0.1 | 0.1 | 0.1 | 0.1 | 0.1 | 0.1 | 0.1 | 0.1 | 0.1 |
| BaO | 0.1 | 0.1 | 0.1 | 0.1 | 0.1 | 0.1 | 0.1 | 0.1 | 0.1 | 0.1 |
| $ZrO_2$ | 0.5 | 1.5 | 1.0 | 0.5 | 0.5 | 0.5 | 0 | 0 | 0 | 0.5 |
| $Na_2O$ | 12.7 | 11.5 | 12.0 | 12.0 | 12.0 | 12.0 | 13.0 | 13.0 | 13.0 | 12.5 |
| $K_2O$ | 4.0 | 4.5 | 4.0 | 4.0 | 4.0 | 4.0 | 4.0 | 4.0 | 4.0 | 4.0 |
| Tg | 597 | 612* | 610* | 610* | 614 | 610* | 620* | 630* | 670* | 608 |
| CS1 | 1003 | 1013 | 984 | 963 | 954 | 983 | 1072 | 1145 | 1221 | 1024 |
| CS2 | 588 | 564 | 561 | 546 | 576 | 574 | 640 | 641 | 647 | 582 |
| r | 0.59 | 0.56 | 0.57 | 0.57 | 0.60 | 0.58 | 0.60 | 0.56 | 0.53 | 0.57 |
| R | 0.57 | 0.54 | 0.55 | 0.55 | 0.56 | 0.57 | 0.59 | 0.54 | 0.51 | 0.57 |

TABLE 3

| Glass | A19 | A20 | A21 | A22 | A23 | A24 | A25 | A26 | A27 |
|---|---|---|---|---|---|---|---|---|---|
| $SiO_2$ | 64.3 | 63.5 | 66.0 | 64.5 | 65.0 | 63.5 | 64.3 | 71.3 | 66.7 |
| $Al_2O_3$ | 8.5 | 10.5 | 9.0 | 9.0 | 5.0 | 5.0 | 6.0 | 2.0 | 10.8 |
| MgO | 10.5 | 9.0 | 8.0 | 12.0 | 12.0 | 8.0 | 11.0 | 10.4 | 6.2 |
| CaO | 0.1 | 0 | 0 | 0 | 0.5 | 4.0 | 0.1 | 0.3 | 0.6 |
| SrO | 0.1 | 0 | 0 | 0 | 0 | 0 | 0.1 | 0.03 | 0 |
| BaO | 0.1 | 0 | 0 | 0 | 0 | 0 | 0.1 | 0.02 | 0 |
| $ZrO_2$ | 0 | 0 | 0 | 0 | 0 | 1.3 | 2.5 | 0.5 | 0 |
| $Na_2O$ | 12.5 | 15.0 | 15.0 | 11.5 | 11.0 | 9.4 | 12.0 | 10.8 | 13.2 |
| $K_2O$ | 4.0 | 2.0 | 2.0 | 3.0 | 6.5 | 8.9 | 4.0 | 4.6 | 2.4 |
| Tg | 610* | 630* | 610* | 650* | 570* | 580* | 620 | 580* | 595 |
| CS1 | 985 | 1190 | 1054 | 919 | 746 | 668 | 1019 | 664 | 1039 |
| CS2 | 577 | 752 | 722 | 516 | 382 | 240 | 571 | 407 | 679 |
| r | 0.59 | 0.63 | 0.69 | 0.56 | 0.51 | 0.36 | 0.56 | 0.61 | 0.65 |
| R | 0.57 | 0.64 | 0.66 | 0.58 | 0.50 | 0.35 | 0.55 | 0.59 | 0.64 |

From these results, it has been found that there is a high correlation between R calculated by the above formula (shown in the bottom rows in Tables 1 to 3) and the above r. FIG. 1 is a scatter graph to make this point clear wherein the abscissa represents R and the ordinate represents r, and the straight line in the FIG. represents $r=1.027 \times R - 0.0017$. The correlation coefficient is 0.97.

From the above correlation found by the present inventors, the following is evident. That is, in order to reduce the frequency of replacement of the molten salt, glass having a less degree of decrease in S due to an increase of the Na concentration in the molten salt i.e. glass having the above r being large, may be used, and for such a purpose, the above R of the glass may be made to be large.

By making R being at least 0.66, the above r can be made to be at least 0.66 and as a result, it is possible to ease controls of the Na concentration in the molten salt as compared with conventional one, or it is possible to reduce the frequency of replacement of the molten salt. R is preferably at least 0.68.

The glass of the present invention essentially comprises the above-described components, but may contain other components within a range not to impair the object of the present invention. In a case where such other components are contained, the total content of such components is preferably at most 5%, typically at most 3%. The total content of $SiO_2$, $Al_2O_3$, MgO, $Na_2O$ and $K_2O$ is particularly preferably at least 98%. Now, such other components will be exemplified.

CaO, SrO and BaO may be contained in order to improve the melting property at a high temperature or to prevent devitrification, but they may lower the ion exchange rate or resistance against cracking. In a case where at least one of CaO, SrO and BaO is contained, the content of each component is preferably at most 1%, more preferably at most 0.5%. Further, in such a case, the total content of these three components is preferably at most 1%, more preferably at most 0.5%.

ZnO may be contained in a certain case, in order to improve the melting property of glass at a high temperature, but its content in such a case is preferably at most 1%. In a case of production by a float process, ZnO is preferably at most 0.5%. If ZnO exceeds 0.5%, it is likely to be reduced during the float forming to form a product defect. Typically no ZnO is contained.

$B_2O_3$ may be contained within a range of e.g. less than 1% in some cases, in order to improve the melting property of glass at a high temperature. If $B_2O_3$ is at least 1%, homogeneous glass tends to be hardly obtainable, and the glass forming may be difficult, or the chipping resistance may deteriorate. Typically no $B_2O_3$ is contained.

$TiO_2$ is likely to deteriorate the visible light transmittance and to color glass to be brown when it is coexistent with Fe ions in the glass, and therefore, its content is preferably at most 1% if contained, and typically, it is not contained.

$Li_2O$ is a component to lower the strain point and to bring about a stress relaxation thereby to make it difficult to stably obtain a surface compressive stress layer and therefore it is preferably not contained, and even if contained, its content is preferably less than 1%, more preferably at most 0.05%, particularly preferably less than 0.01%.

As a clarifying agent at the time of melting glass, $SO_3$, a chloride, a fluoride or the like may suitably be contained. However, in order to increase the visibility of display devices such as touch panels, it is preferred to reduce components which may be included as impurities in raw materials such as $Fe_2O_3$, NiO, $Cr_2O_3$, etc. having an absorption in a visible light range as far as possible, and the content of each of them is preferably at most 0.15%, more preferably at most 0.1%, particularly preferably at most 0.05%, as represented by mass percentage.

In the glass of the present invention, $R_2O$—$Al_2O_3$ is less than 10%, and also in the case of the following glass C, the object of the present invention can be accomplished, and yet, the above-mentioned r can be made large. Here, with respect to glass C, the description relating to the glass of the present invention is applicable as it is, except for $R_2O$—$Al_2O_3$ being less than 10%, and in glass C, it is preferred that $R_2O$—$Al_2O_3$ is made to be less than 10%.

Glass C: Glass for chemical tempering, which comprises, as represented by mole percentage based on oxides, from 63 to 66% of $SiO_2$, from 7 to 10% of $Al_2O_3$, from 8 to 12% of MgO, from 12 to 17% of $Na_2O$, and from 0 to 3% of $K_2O$, wherein when $ZrO_2$ is contained, its content is at most 0.5%, and wherein R calculated by the following formula by using the contents of the respective components of $SiO_2$, $Al_2O_3$, MgO, CaO, $ZrO_2$, $Na_2O$ and $K_2O$ is at least 0.66:

$$R=0.029 \times SiO_2+0.021 \times Al_2O_3+0.016 \times MgO-0.004 \times CaO+0.016 \times ZrO_2+0.029 \times Na_2O+0 \times K_2O-2.002$$

EXAMPLES

In Tables 4 to 6, Ex. 1 to 9 are Working Examples of the present invention and Ex. 10 to 20 are Comparative Examples. Among them, glass in Ex. 11 is similar to Example 19 in the above-mentioned Patent Document 2, and glasses in Ex. 20, 13 and 21 are, respectively, the same as Example 1, Example 14 and Comparative Example 54 in the same Document. The glass compositions in Tables 4 to 6 are compositions as represented by mole percentage, while in Tables 7 to 9, compositions as represented by mass percentage of glasses in Ex. 1 to 21 are shown.

With respect to glasses in Ex. 1 to 8 and 10 to 14, raw materials for the respective components were mixed to have compositions as represented by mol % in columns for $SiO_2$ to BaO in Tables, and melted at a temperature of from 1550 to 1650° C. for from 3 to 5 hours by means of a platinum crucible. At the time of melting, a platinum stirrer was inserted in molten glass, and stirring was carried out for two hours to homogenize the glass. Then, molten glass was cast to form a plate and annealed to room temperature at a cooling rate of 1° C./min. $R_2O$ represents the total of the respective contents (unit: mol %) of $Na_2O$ and $K_2O$.

With respect to these glasses, the specific gravity d, the average linear expansion coefficient α (unit: $^{-7}$/° C.), the glass transition point Tg (unit: ° C.), the temperature T2 (unit: ° C.) at which the viscosity becomes to be $10^2$ dPa·s, and the temperature T4 (unit: ° C.) at which the viscosity becomes to be $10^4$ dPa·s, are shown in Tables.

Measurements thereof were carried out as follows.

d: Measured by Archimedes' method using from 20 to 50 g of foamless glass.

α: By means of a differential dilatometer and using quartz glass as a reference sample, the expansion rate of glass at the time of raising the temperature from room temperature at a rate of 5° C./min, was measured to a temperature at which the glass was softened so that its expansion was no longer observed i.e. to the yield point, whereupon from the thermal expansion curve thereby obtained, the average linear expansion coefficient at from 50 to 350° C. was calculated.

Tg: By means of a differential dilatometer and using quartz glass as a reference sample, the expansion rate of glass at the time of raising the temperature from room temperature at a rate of 5° C./min, was measured to the yield point, whereby in the thermal expansion curve thereby obtained, a temperature corresponding to a folding point was taken as the glass transition point.

T2, T4: Measured by a rotational viscometer.

Both surfaces of each glass plate having a thickness of 1 mm and a size of 5 mm×40 mm obtained as described above in Ex. 1 to 8 and 10 to 14, was mirror-polished with cerium oxide and then subjected to the following chemical tempering treatment. That is, such a glass plate was immersed in a molten potassium salt at 450° C. for 270 minutes in Ex. 1, 2 or 7, for 120 minutes in Ex. 3, for 300 minutes in Ex. 4, 180 minutes in Ex. 5, for 320 minutes in Ex. 6, for 210 minutes in Ex. 8, for 195 minutes in Ex. 10, for 330 minutes in Ex. 11, for 300 minutes in Ex. 12, for 450 minutes in Ex. 13, or for 1380 minutes in Ex. 14, for tempering treatment to obtain a chemically tempered glass plate. In the molten potassium salt, the $KNO_3$ content was from 95 to 100%, and the $NaNO_3$ content was from 0 to 5%. The specific $KNO_3$ content was 99% in Ex. 1, 2 or 11, 100% in Ex. 3, 10 or 13, 95% in Ex. 4, 5 or 14, 99.3% in Ex. 6, 97% in Ex. 7 or 8, or 99.5% in Ex. 12.

With respect to these chemically tempered glass plates, the surface compressive stress S (unit: MPa) and the compressive stress layer depth t (unit: μm) were measured by means of a surface stress meter FSM-6000 manufactured by Orihara Manufacturing Co., Ltd. The results are shown in the corresponding rows in Tables.

With respect to 20 sheets each of these 13 types of chemically tempered glass plates, the flexural strength was measured, and an average value F0 (unit: MPa) of flexural strength was obtained. Here, the accuracy of flexural strength measurement was ±30 MPa, and the measurement of the flexural strength was carried out by a three point flexural test under conditions of a span of 30 mm and a crosshead speed of 0.5 mm/min.

Further, with respect to 20 sheets each of these 13 types of chemically tempered glass plates, by means of a Vickers hardness meter, a Vickers indenter was pressed with a force of 1 kgf=9.8N against the center of each glass plate under conditions of a temperature of from 20 to 28° C. and a humidity of from 40 to 60%, to form an indentation. With respect to 20 sheets each of 4 types of chemically tempered glass plates having an indentation thus formed with a force of 1 kgf, the flexural strength was measured, and an average value F1 (unit: MPa) of flexural strength was obtained.

Further, with respect to 20 sheets each of these 13 types of chemically tempered glass plates, by means of a Vickers hardness meter, a Vickers indenter was pressed with a force of 2 kgf=9.8N against the center of each glass plate under conditions of a temperature of from 20 to 28° C. and a humidity of from 40 to 60%, to form an indentation. With respect to 20 sheets each of 4 types of chemically tempered glass plates having an indentation thus formed with a force of 2 kgf, the flexural strength was measured, and an average value F2 (unit: MPa) of flexural strength was obtained. F0, F1 and F2 are shown together with F1/F0 and F2/F0 in the corresponding rows in Tables. Here, in Ex. 1 and 2, F1/F0 exceeds 1, which is attributable to an accidental error in measurement of F0 or F1.

With those obtained by chemically tempering glasses in Ex. 11 to 14, F1 is lower than F0, while with those obtained by chemically tempering glasses in Ex. 1 to 8, F1 has the same or substantially the same value as F0. Further, with those obtained by chemically tempering glasses in Ex. 1 to 8, the difference between F0 and F2 is smaller as compared with those obtained by chemically tempering glasses in Ex. 11 to 14. With those obtained by chemically tempering glasses in Ex. 4 and 8, F2 is also the same or substantially the same as F0, which shows that the advantageous effects of the present invention are particularly high. Further, with one obtained by chemically tempering glass in Ex. 10, F1 has substantially the same value as F0, but Tg is low.

In Ex. 9 and Ex. 15 to 21, with respect to chemically tempered glasses having S of 800 MPa and t of 50 μm, their F0, F1 and F2 were estimated from the respective glass compositions.

TABLE 4

| Ex. | 1 | 2 | 3 | 4 | 5 | 6 | 7 |
|---|---|---|---|---|---|---|---|
| $SiO_2$ | 64.3 | 64.3 | 65.3 | 64.0 | 63.0 | 64.3 | 63.5 |
| $Al_2O_3$ | 8.0 | 8.0 | 7.0 | 11.0 | 12.0 | 8.5 | 10.5 |
| MgO | 10.9 | 10.4 | 11.2 | 9.0 | 7.0 | 10.5 | 9.0 |
| $Na_2O$ | 12.0 | 12.5 | 9.0 | 15.0 | 17.0 | 12.5 | 15.0 |
| $K_2O$ | 4.0 | 4.0 | 7.0 | 1.0 | 1.0 | 4.0 | 2.0 |
| $ZrO_2$ | 0.5 | 0.5 | 0.5 | 0 | 0 | 0 | 0 |
| CaO | 0.1 | 0.1 | 0 | 0 | 0 | 0.1 | 0 |
| SrO | 0.1 | 0.1 | 0 | 0 | 0 | 0.1 | 0 |
| BaO | 0.1 | 0.1 | 0 | 0 | 0 | 0.1 | 0 |
| $R_2O$ | 16.0 | 16.5 | 16.0 | 16.0 | 18.0 | 16.8 | 17.0 |
| $R_2O-Al_2O_3$ | 8.0 | 8.5 | 9.0 | 5.0 | 6.0 | 8.3 | 6.5 |
| R | 0.56 | 0.57 | 0.49 | 0.66 | 0.68 | 0.57 | 0.64 |
| d | 2.48 | 2.48 | 2.46 | 2.46 | 2.46 | 2.47 | 2.46 |
| α | 98 | 98 | 102 | 91 | 98 | 104 | 99 |
| Tg | 614 | 608 | 611 | 637 | 631 | 596 | 619 |
| T2 | 1612 | 1605 | 1633 | 1669 | 1667 | 1617 | 1638 |
| T4 | 1187 | 1181 | 1201 | 1211 | 1203 | 1183 | 1195 |
| S | 761 | 789 | 710 | 813 | 839 | 831 | 850 |
| t | 53 | 50 | 49 | 49 | 46 | 49 | 50 |
| F0 | 601 | 613 | 667 | 721 | 742 | 681 | 664 |
| F1 | 609 | 617 | 666 | 714 | 717 | 634 | 663 |
| F2 | 457 | 456 | 646 | 664 | 649 | 545 | 579 |
| F1/F0 | 1.01 | 1.01 | 1.00 | 0.99 | 0.97 | 0.93 | 1.00 |
| F2/F0 | 0.76 | 0.74 | 0.97 | 0.92 | 0.88 | 0.80 | 0.87 |

TABLE 5

| Ex. | 8 | 9 | 10 | 11 | 12 | 13 | 14 |
|---|---|---|---|---|---|---|---|
| $SiO_2$ | 66.0 | 64.3 | 65.0 | 64.3 | 64.3 | 66.7 | 61.0 |
| $Al_2O_3$ | 9.0 | 8.5 | 5.0 | 6.0 | 7.0 | 3.6 | 11.0 |
| MgO | 8.0 | 10.7 | 12.0 | 10.9 | 10.9 | 12.1 | 13.0 |
| $Na_2O$ | 15.0 | 12.5 | 11.0 | 12.0 | 12.5 | 11.0 | 14.2 |
| $K_2O$ | 2.0 | 4.0 | 6.5 | 4.0 | 4.0 | 4.2 | 0 |
| $ZrO_2$ | 0 | 0 | 0 | 2.5 | 1.0 | 0.7 | 0.8 |
| CaO | 0 | 0 | 0.5 | 0.1 | 0.1 | 1.1 | 0 |
| SrO | 0 | 0 | 0 | 0.1 | 0.1 | 0.6 | 0 |
| BaO | 0 | 0 | 0 | 0.1 | 0.1 | 0 | 0 |
| $R_2O$ | 17.0 | 16.5 | 18.0 | 16.0 | 16.5 | 15.2 | 14.2 |
| $R_2O-Al_2O_3$ | 8.0 | 8.0 | 13.0 | 10.0 | 9.5 | 11.6 | 3.2 |
| R | 0.66 | 0.57 | 0.50 | 0.55 | 0.56 | 0.53 | 0.63 |
| d | 2.45 | 2.47 | 2.47 | 2.52 | 2.50 | 2.50 | 2.50 |
| α | 99 | 98 | 109 | 91 | 98 | 97 | 83 |
| Tg | 599 | 612 | 558 | 620 | 603 | 569 | 678 |
| T2 | 1662 | 1618 | 1544 | 1566 | 1588 | 1529 | 1597 |
| T4 | 1200 | 1184 | 1128 | 1167 | 1164 | 1121 | 1193 |
| S | 770 | 800 | 680 | 780 | 833 | 746 | 828 |
| t | 50 | 50 | 53 | 51 | 51 | 50 | 53 |
| F0 | 585 | 600 | 574 | 584 | 653 | 637 | 744 |
| F1 | 613 | 600 | 543 | 415 | 520 | 457 | 499 |
| F2 | 584 | 500 | 429 | 280 | 412 | 207 | 377 |
| F1/F0 | 1.05 | 1.00 | 0.95 | 0.71 | 0.80 | 0.72 | 0.67 |
| F2/F0 | 1.00 | 0.83 | 0.75 | 0.48 | 0.63 | 0.33 | 0.51 |

TABLE 6

| Ex. | 15 | 16 | 17 | 18 | 19 | 20 | 21 |
|---|---|---|---|---|---|---|---|
| $SiO_2$ | 66.0 | 68.0 | 60.0 | 64.3 | 68.5 | 67.4 | 64.8 |
| $Al_2O_3$ | 6.0 | 5.0 | 13.0 | 6.2 | 7.4 | 3.7 | 5.3 |
| MgO | 7.2 | 6.0 | 14.0 | 13.0 | 7.9 | 12.2 | 12.1 |
| $Na_2O$ | 14.0 | 15.8 | 13.0 | 8.0 | 12.2 | 8.1 | 11.0 |
| $K_2O$ | 6.0 | 4.2 | 0 | 8.0 | 4.0 | 6.3 | 6.3 |
| $ZrO_2$ | 0.8 | 1.0 | 0 | 0.5 | 0 | 0.7 | 0 |
| CaO | 0 | 0 | 0 | 0 | 0 | 1.0 | 0.5 |
| SrO | 0 | 0 | 0 | 0 | 0 | 0.6 | 0 |
| BaO | 0 | 0 | 0 | 0 | 0 | 0 | 0 |
| $R_2O$ | 20.0 | 20.0 | 13.0 | 16.0 | 16.2 | 14.4 | 17.3 |
| $R_2O-Al_2O_3$ | 14.0 | 15.0 | 0 | 3.0 | 8.8 | 10.7 | 12.0 |
| R | 0.57 | 0.65 | 0.61 | 0.44 | 0.62 | 0.47 | 0.50 |
| d | 2.48 | 2.47 | 2.49 | 2.47 | 2.43 | 2.59 | 2.46 |
| α | 111 | 109 | 86 | 99 | 95 | 90 | 100 |
| Tg | 541 | 539 | 705 | 624 | 603 | 579 | 568 |
| T2 | 1591 | 1589 | 1634 | 1596 | 1693 | 1575 | 1548 |
| T4 | 1148 | 1137 | 1224 | 1181 | 1213 | 1158 | 1132 |
| S | 800 | 800 | 800 | 800 | 800 | 800 | 800 |
| t | 50 | 50 | 50 | 50 | 50 | 50 | 50 |
| F0 | 600 | 600 | 600 | 600 | 600 | 600 | 600 |
| F1 | 550 | 350 | 450 | 400 | 600 | 450 | 500 |
| F2 | 450 | 250 | 300 | 300 | 550 | 300 | 350 |
| F1/F0 | 0.92 | 0.58 | 0.75 | 0.67 | 1.00 | 0.75 | 0.83 |
| F2/F0 | 0.75 | 0.42 | 0.50 | 0.50 | 0.92 | 0.50 | 0.58 |

TABLE 7

| Ex. | 1 | 2 | 3 | 4 | 5 | 6 | 7 |
|---|---|---|---|---|---|---|---|
| $SiO_2$ | 61.0 | 60.9 | 61.6 | 60.5 | 58.8 | 61.0 | 59.9 |
| $Al_2O_3$ | 12.9 | 12.9 | 11.2 | 17.7 | 19.0 | 13.7 | 16.8 |
| MgO | 6.9 | 6.6 | 7.1 | 5.7 | 4.4 | 6.7 | 5.7 |
| $Na_2O$ | 11.7 | 12.2 | 8.8 | 14.6 | 16.4 | 12.2 | 14.6 |
| $K_2O$ | 6.0 | 5.9 | 10.4 | 1.5 | 1.5 | 5.9 | 3.0 |
| $ZrO_2$ | 1.0 | 1.0 | 1.0 | 0 | 0 | 0 | 0 |
| CaO | 0.1 | 0.1 | 0 | 0 | 0 | 0.1 | 0 |
| SrO | 0.2 | 0.2 | 0 | 0 | 0 | 0.2 | 0 |
| BaO | 0.2 | 0.2 | 0 | 0 | 0 | 0.2 | 0 |

TABLE 8

| Ex. | 8 | 9 | 10 | 11 | 12 | 13 | 14 |
|---|---|---|---|---|---|---|---|
| $SiO_2$ | 62.7 | 61.2 | 62.8 | 60.6 | 61.1 | 65.2 | 58.3 |
| $Al_2O_3$ | 14.5 | 13.7 | 8.2 | 9.6 | 11.3 | 6.0 | 17.8 |
| MgO | 5.1 | 6.8 | 7.8 | 6.9 | 6.9 | 7.9 | 8.3 |
| $Na_2O$ | 14.7 | 12.3 | 11.0 | 11.7 | 12.3 | 11.1 | 14.0 |
| $K_2O$ | 3.0 | 6.0 | 9.8 | 5.9 | 6.0 | 6.4 | 0 |
| $ZrO_2$ | 0 | 0 | 0 | 4.8 | 1.9 | 1.4 | 1.6 |
| CaO | 0 | 0 | 0.5 | 0.1 | 0.1 | 1.0 | 0 |
| SrO | 0 | 0 | 0 | 0.2 | 0.2 | 1.0 | 0 |
| BaO | 0 | 0 | 0 | 0.2 | 0.2 | 0 | 0 |

TABLE 9

| Ex. | 15 | 16 | 17 | 18 | 19 | 20 | 21 |
|---|---|---|---|---|---|---|---|
| $SiO_2$ | 61.9 | 64.5 | 57.2 | 61.0 | 65.1 | 65.1 | 62.5 |
| $Al_2O_3$ | 9.5 | 8.0 | 21.0 | 10.0 | 11.9 | 6.1 | 8.7 |
| MgO | 4.4 | 3.8 | 9.0 | 8.3 | 5.0 | 7.9 | 7.8 |
| $Na_2O$ | 13.5 | 15.5 | 12.8 | 7.8 | 12.0 | 8.1 | 11.0 |
| $K_2O$ | 9.1 | 6.2 | 0 | 11.9 | 6.0 | 9.5 | 9.5 |
| $ZrO_2$ | 1.5 | 1.9 | 0 | 1.0 | 0 | 1.4 | 0 |
| CaO | 0 | 0 | 0 | 0 | 0 | 0.9 | 0.5 |
| SrO | 0 | 0 | 0 | 0 | 0 | 1.0 | 0 |
| BaO | 0 | 0 | 0 | 0 | 0 | 0 | 0 |

INDUSTRIAL APPLICABILITY

The present invention is useful for e.g. a cover glass for a display device. Further, it is useful also for e.g. a solar cell substrate or a window glass for aircrafts.

This application is a continuation of PCT Application No. PCT/JP2011/071901, filed on Sep. 26, 2011, which is based upon and claims the benefit of priority from Japanese Patent Application No. 2010-215982 filed on Sep. 27, 2010. The contents of Patent Application No. 2010-288255 filed on Dec. 24, 2010. The contents of those applications are incorporated herein by reference in its entirety.

What is claimed is:

1. A plate glass which comprises, as represented by mole percentage based on oxides, from 62 to 66% of $SiO_2$, from 7.5 to 9% of $Al_2O_3$, from 8 to 13% of MgO, from 9 to 16% of $Na_2O$, from 0.5 to 7% of $K_2O$, 0% $B_2O_3$, 0% ZnO, and from 0 to 1% of CaO, wherein the difference obtained by subtracting the content of $Al_2O_3$ from the total content of $Na_2O$ and $K_2O$ is at most 9%, and optionally $ZrO_2$ in an amount of at most 0.6%, wherein the plate glass has a glass transition point of at least 570° C. and a specific gravity of at most 2.55.

2. The plate glass according to claim 1, wherein the content of CaO is from 0 to 0.5%.

3. The plate glass according to claim 1, wherein $ZrO_2$ is contained in an amount of at most 0.5%.

4. The plate glass according to claim 1 or 2, wherein the content of $Na_2O$ is from 9 to 12.5%.

5. The plate glass according to claim 1 or 2, wherein the content of $Na_2O$ is from 12 to 16%.

6. The plate glass according to claim 1 or 2, wherein the total content of CaO, SrO and BaO is at most 1%.

7. The plate glass according to claim 1 or 2, wherein the total content of $SiO_2$ and $Al_2O_3$ is more than 72% and at most 76%.

8. The plate glass according to claim 1 or 2, wherein the content of MgO is from 8 to 11%.

9. The plate glass according to claim 1 or 2, wherein the content of $SiO_2$ is from 63 to 65%.

10. The plate glass according to claim 1, wherein the total content of $Na_2O$ and MgO is from 21 to 25%.

11. The plate glass according to claim 1, wherein $ZrO_2$ is contained in an amount of at most 0.6%.

* * * * *